UNITED STATES PATENT OFFICE.

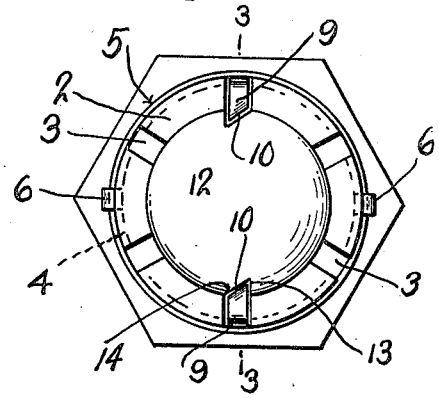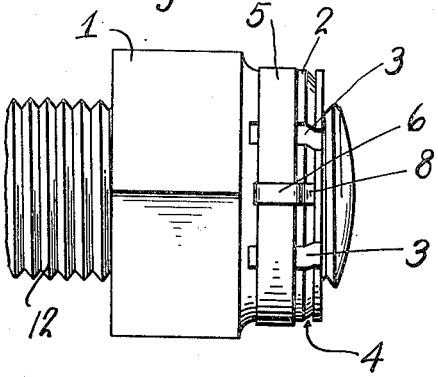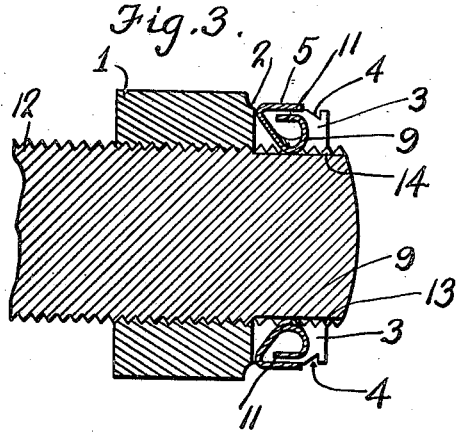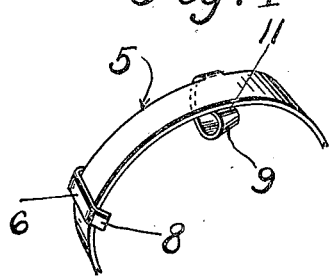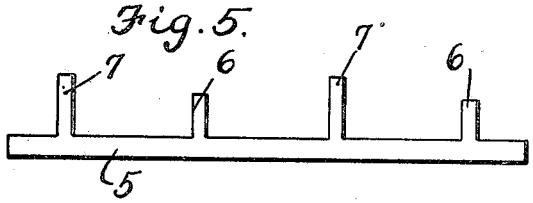

JOHN A. KIMBALL, OF TAYLORVILLE, ILLINOIS.

NUT-LOCK.

1,373,335.   Specification of Letters Patent.   Patented Mar. 29, 1921.

Application filed October 4, 1920. Serial No. 414,423.

*To all whom it may concern:*

Be it known that I, JOHN A. KIMBALL, a citizen of the United States, residing at Taylorville, in the county of Christian and State of Illinois, have invented new and useful Improvements in Nut-Locks, of which the following is a specification.

My present invention has reference to a simple means for effectively locking a nut on a bolt to prevent the movement of the same in an unscrewing direction.

My primary object is to provide an ordinary castellated nut with means, surrounding the castellated portion thereof and passing through the castellations which are engaged in notches or depressions in the bolt on which the nut is screwed, the latter being provided with spaced depressions of a shape to permit of the elements carried by the nut ratcheting thereover when the nut is being screwed home on the bolt, and to also engage with such elements to prevent the unscrewing of the nut on the bolt.

It is also my purpose to provide the reduced castellated end of a nut with an annular groove in which is seated securing means carried by a spring band that surrounds the said end of the nut, the band being formed with spaced fingers that are bent from the castellations and are rounded upon themselves to provide spring detents or guards which are designed to be received in grooves provided in the threaded shank of the bolt with which the nut engages, the grooves providing each a straight wall and an angle wall extending therefrom which permits of the dogs or detents ratcheting over the angle walls when the nut is being screwed home on the bolt but also causes the said detents or dogs to contact with the straight walls of the grooves to prevent the unscrewing of the nut from the bolt.

A further object is the production of a castellated nut having removable spring means secured thereon for engaging with the walls of grooves in a bolt wherein the necessity of providing the bolt with spaced openings and the employment of cotter pins that pass through the castellations of the nut and the openings of the bolt will be dispensed with, so that the bolt will not be thus weakened, and also wherein the walls of the castellations on the nut provide supports or reinforcing means for the bolt engaging elements.

The foregoing objects, and others which will appear as the nature of the invention is better understood, may be accomplished by a construction, combination and operative arrangement of parts, such as is illustrated by the drawings which accompany and form part of this application.

In the drawings:—

Figure 1 is an end view showing a nut locked on a bolt in accordance with this invention.

Fig. 2 is a side elevation thereof.

Fig. 3 is a sectional view approximately on the line 3—3 of Fig. 1, on an enlarged scale.

Fig. 4 is a perspective view of a portion of the nut locking means, removed from the nut.

Fig. 5 is a plan view of the blank from which the locking means is formed.

The nut 1 has its body portion of the usual construction, having any desired number of sides or faces, but is provided on its outer end with a reduced rounded extension 2 provided with spaced slots or notches 3. This castellated end of the nut, I provide, adjacent to the outer end thereof with an annular substantially V-shaped depression 4.

On large nuts, where the saving of material is a consideration, the spring locking means, which I employ is removably associated with the nuts.

As disclosed by the drawings, I provide a strip of spring material which is stamped to form one of the edges thereof with alternating long and short projections. The strip is then brought to tubi-form, thus producing a band which is of a size to be snugly received over the castellated end of the nut. This band is indicated by the numeral 5, the short fingers by the numeral 6 and the long fingers by the numeral 7. The long fingers are of a width approximately equaling that of the slots in the nut and are designed to be received therethrough, entering the bore of the nut. The short fingers are bent rearwardly over the band and have their ends flanged angularly as at 8, and the said angle ends enter the substantially V-shaped depression 4. By the employment of a suitable tool the angle ends of the short fingers may be brought out of the depressions, and consequently the locking means may be readily slid over the castellated end of the nut. The longer fingers are bent upon themselves to provide spring pressed dogs 9. The outer edges of the dogs are arranged at an inclination, or otherwise beveled, so that the active faces of the dogs are V-shaped in plan, as indicated by the numeral 10. The free ends of the dogs, that is at the rounded portions thereof may contact with the under face of the band 5, as indicated by the numeral 11 which materially strengthen the said dogs. As the edges of the dogs, at the portions thereof which are disposed in the castellations of the nut, contact with the side walls provided thereby a comparatively thin strap of spring metal may be employed in constructing the locking means. The nut is screwed on a bolt 12. This bolt has its threaded shank provided with any desired number of spaced grooves. The grooves define straight walls 13 and angle walls 14. The grooves are so arranged that the angle active faces of the dogs will ratchet thereover when the nut is screwed home on the bolt, but the straight edges of the dogs will contact with the straight walls or shoulders 13 provided in the grooves of the bolt which will prevent the unscrewing of the nut from the bolt.

Having thus described the invention, what I claim, is:—

1. The combination, a bolt having its threaded shank provided with longitudinal V-shaped grooves, a nut having a castellated end screwed on the bolt and the said castellated portion of the nut having an annular V-shaped groove, a spring band arranged on the said end of the nut, elements integrally formed with the band entering the groove of the nut for holding the band on the nut, fingers formed on one of the edges of the band passing through the castellations of the nut and rounded upon themselves to provide dogs that have their ends contacting with the inner face of the band and their active faces arranged at an angle whereby the said dogs may ratchet over the grooves of the bolt when the nut is screwed home on the bolt and also whereby the straight ends of the dogs will contact with the straight walls of the grooves to prevent the unscrewing of the nut from the bolt.

2. In combination, a grooved bolt and a castellated nut screwed thereon, a band surrounding the nut at the outer end thereof, co-engaging means between the band and nut for holding the former on the latter, spring dogs integrally formed on one of the edges of the band, rounded upon themselves received in the castellations of the nut and in the grooves of the bolt, and said dogs when in one position having their free ends in contacting engagement with the band.

In testimony whereof I affix my signature.

JOHN A. KIMBALL.